United States Patent
Childress et al.

(10) Patent No.: US 12,299,164 B2
(45) Date of Patent: May 13, 2025

(54) DATA SECURITY COMPLIANCE FOR MOBILE DEVICE APPLICATIONS

(71) Applicant: International Business Machines Corporation, Armonk, NY (US)

(72) Inventors: Rhonda L. Childress, Austin, TX (US); Michael Bender, Rye Brook, NY (US); Craig M. Trim, Ventura, CA (US); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 16/439,735

(22) Filed: Jun. 13, 2019

(65) Prior Publication Data

US 2020/0394327 A1  Dec. 17, 2020

(51) Int. Cl.
  *G06F 21/62* (2013.01)
  *G06F 16/182* (2019.01)
  *G06F 16/906* (2019.01)

(52) U.S. Cl.
  CPC ...... *G06F 21/6245* (2013.01); *G06F 16/1824* (2019.01); *G06F 16/906* (2019.01); *G06F 2221/2141* (2013.01)

(58) Field of Classification Search
  CPC ......... G06F 21/6245; G06F 2221/2141; G06F 16/906; G06F 16/1824
  USPC .......................................................... 726/2
  See application file for complete search history.

(56) References Cited

U.S. PATENT DOCUMENTS

| | | | |
|---|---|---|---|
| 8,533,844 B2 | 9/2013 | Mahaffey et al. | |
| 9,152,815 B2 * | 10/2015 | Baentsch | G06F 21/6218 |
| 9,430,613 B1 * | 8/2016 | Walton, III | G16H 10/60 |
| 9,740,852 B2 | 8/2017 | Mahaffey et al. | |
| 9,882,935 B2 | 1/2018 | Barday | |
| 9,992,025 B2 | 6/2018 | Mahaffey et al. | |
| 2006/0015416 A1 * | 1/2006 | Hoffman | G06Q 10/06 705/28 |
| 2006/0212593 A1 * | 9/2006 | Patrick | G06Q 30/00 709/230 |
| 2007/0266420 A1 | 11/2007 | Hawkins et al. | |
| 2008/0091934 A1 * | 4/2008 | Peterson | G06F 21/6281 713/2 |
| 2008/0168437 A1 * | 7/2008 | Chen | H04N 7/15 717/176 |
| 2010/0088367 A1 * | 4/2010 | Brown | G06F 8/60 455/414.1 |

(Continued)

OTHER PUBLICATIONS

NPL Search Terms (Year: 2021).*

(Continued)

*Primary Examiner* — Syed A Zaidi
(74) *Attorney, Agent, or Firm* — Michael O'Keefe (57) ABSTRACT

Embodiments of the present invention provides methods, computer program products, and a system for maintain application compliance. Embodiments of the present invention identify locations of potentially sensitive data. Embodiments of the present invention identify a set of individuals associated with the potentially sensitive data and determine whether an application can be installed based on content of potentially sensitive data and on elections of respective individuals associated with the potentially sensitive data.

7 Claims, 5 Drawing Sheets

(56) References Cited

U.S. PATENT DOCUMENTS

| | | | | |
|---|---|---|---|---|
| 2011/0029622 | A1* | 2/2011 | Walker | G06Q 10/107 709/206 |
| 2011/0047597 | A1* | 2/2011 | Mahaffey | H04L 67/60 709/219 |
| 2012/0036552 | A1* | 2/2012 | Dare | H04L 41/0803 726/1 |
| 2013/0041835 | A1* | 2/2013 | Thompson | G06Q 40/02 705/322 |
| 2013/0318207 | A1* | 11/2013 | Dotter | G06F 11/1469 709/219 |
| 2013/0326477 | A1* | 12/2013 | Wyatt | G06F 21/57 717/120 |
| 2014/0122702 | A1* | 5/2014 | Jung | H04W 12/02 709/224 |
| 2015/0134619 | A1* | 5/2015 | Factor | G06F 16/164 707/663 |
| 2015/0227746 | A1* | 8/2015 | Chen | G06F 21/54 726/25 |
| 2015/0309813 | A1* | 10/2015 | Patel | G06F 11/3664 703/22 |
| 2016/0170844 | A1* | 6/2016 | Long | G06F 11/1469 707/679 |
| 2016/0197930 | A1* | 7/2016 | Yuen | H04L 63/0876 726/4 |
| 2017/0193624 | A1 | 7/2017 | Tsai | |
| 2017/0359387 | A1* | 12/2017 | Barday | G06Q 10/06 |

OTHER PUBLICATIONS

Meling, Jon, et al. "Gohcci: Protecting sensitive data on stolen or misplaced mobile devices." 2009 Tenth International Conference on Mobile Data Management: Systems, Services and Middleware. IEEE, 2009 (Year: 2009).*

NPL Search Terms (Year: 2024).*

Absalom, Richard, "International Data Privacy Legislation Review: A Guide for BYOD Policies", Mobilelron, Reference Code: IT006-000234, Publication Date: May 17, 2012, @ Ovum, 23 pages.

Cockerill, Aaron, "Why your GDPR compliance strategy must include mobile", Nov. 14, 2017, @ 2019 Lookout, Inc., 12 pages, <https://blog.lookout.com/compliance-gdpr-mobile-security>.

Ewen, James, "GDPR For Apps—What App Developers Should Know", Apr. 9, 2018, Copyright Tamoco 2017, 11 pages, <https://www.tamoco.com/blog/gdpr-app-devlopers-privacy>.

Kaaniche et al. "A Blockchain-based Data Usage Auditing Architecture with Enhanced Privacy and Availability", 978-1-5386-1465-5/17, @ 2017 IEEE, 5 pages.

Phillips, Cassie, "Mobile Marketing & Privacy: App Permissions, Opt-In/Out, PII & Data Protection", AppsFlyer, May 16, 2016, 4 pages. <https://www.appsflyer.com/blog/mobile-marketing-privacy-app-permissions-opt-inout-pii/>.

Samaras et al. "An Enterprise Security Architecture for Accessing SaaS Cloud Services with BYOD", 6 pages.

Westphal et al., "SPIRIT: A Semantic Transparency and Compliance Stack", In: Proceedings of the 14th International Conference on Semantic Systems. CEUR Workshop Proceedings, Aachen. p. 1., Sep. 2018, 5 pages.

"GDPR Compliance for Apps", PrivacyPolicies.com @ 2019, 20 pages, <https://privacypolicies.com/blog/gdpr-compliance-apps/>.

"Mobile privacy: A better practice guide for mobile app developers", Australian Government, Office of the Australian Information Commissioner, Date of initial publication: Sep. 2013, revised Sep. 2014, 21 pages.

"Privacy and data protection in mobile applications a study on the app development ecosystem and the technical implementation of GDPR", Nov. 2017, @ European Union Agency for Network and Information Security (ENISA), 2017, ISBN: 978-92-9204-242-4, DOI: 10.2824/114584, 70 pages.

"Privacy and Mobile Apps", Office of the Information Commissioner Queensland, Current as at: Feb. 13, 2014, 7 pages, <https://www.oic.qld.gov.au/guidelines/for-government/guidelines-privacy-principles/applying-the-privacy- principles/privacy-and-mobile-apps>.

"Smartphone Privacy", Privacy Rights Clearinghouse, Copyright@ 1994-2019, Posted: Aug. 1, 2005/Revised: Dec. 19, 2017, 34 pages, <https://www.privacyrights.org/consumer-guides/smartphone-privacy>.

"5 Privacy Tips for Mobile App Users", TrustArc, Apr. 27, 2011, @ 2019 TrustArc Inc., 3 pages, <https://www.trustarc.com/blog/2011/04/27/5-privacy-tips-for-mobile-app-users/>.

"Regulation (EU) 2016/679 of the European Parliament and of the Council of Apr. 27, 2016", Official Journal of the European Union, Apr. 5, 2016, 88 pages.

* cited by examiner

DATA SECURITY COMPLIANCE FOR MOBILE DEVICE APPLICATIONS

BACKGROUND

The present invention relates generally to the field of data security permissions, and more particularly to data security compliance of mobile devices.

The General Data Protection Regulation (GDPR) provides protection for individuals' personal data by allowing individuals to gain control over their personal data. The GDPR requires that controllers of personal data must put in place appropriate technical and organizational measures to implement data protection principles. Furthermore, GDPR specifies that business processes that handle personal data must be designed and built with consideration of the principles, provide safeguards to protect data, and use the highest-possible privacy settings by default so that the data is not available publicly without explicit, informed consent, and cannot be used to identify a subject without additional information stored separately. No personal data may be processed unless it is done under a lawful basis specified by the regulation, or unless the data controller or processor has received an unambiguous and individualized affirmation of consent from the data subject. A processor of personal data must clearly disclose any data collection, declare the lawful basis and purpose for data processing, and state how long data is being retained and if it is being shared with any third parties or outside of the European Economic Area.

Blockchain refers to a distributed, permissioned, and immutable ledger capable of recording transactions. Blockchain is a decentralized technology comprising a peer-to-peer (P2P) network comprising computers, referred to as nodes. Blockchain further includes methods for the nodes to validate transactions. Once a transaction is validated by the nodes, a new block is added to the existing blockchain containing information to confirm the transaction

SUMMARY

Embodiments of the present invention disclose a method, a computer program product, and a system for maintaining application compliance In one embodiment of the present invention, a method is provided comprising: identifying locations of potentially sensitive data; identifying a set of individuals associated with the potentially sensitive data; and determining whether an application can be installed based on content of potentially sensitive data and on elections of respective individuals associated with the potentially sensitive data.

DETAILED DESCRIPTION

Embodiments of the present invention recognize the need for applied data monitoring and management of personal data associated with an individual. For example, privacy regulations such as GDPR regulations may require careful use and monitoring of data pertaining to an individual, and while corporations have put a tremendous effort into GDPR compliance for data, mobile devices that are owned by a business frequently contain data that needs to be protected based on the law. Before using any data stored on a device in a business environment, approvals might need to be received to use the data. As "bring your own devices" (BYOD) have become more popular in use in the workplace over the recent years, the importance of regulatory compliance (e.g., GDPR compliance) has also increased in kind. This is especially true when a device such as a cell phone is used for business purpose or issued for business purposes.

Certain privacy regulations do not apply to people processing personal data for exclusively personal or household activities. This means a user would not be subject to the regulations if the user keeps personal contact information on a personal computer of the user, or if the user has CCTV cameras placed around a house of the user with the purpose of deterring intruders. However, in the cases where a device such as a mobile phone is issued to an employee by an enterprise, or where an employee uses a personal device for business for an enterprise, privacy regulations such as GDPR will likely apply, along with all the protection that such regulations include.

For example, according to GDPR documentation, privacy principle 6 under "Integrity and Confidentiality" states "Personal data shall be processed in a manner that ensures appropriate security of the personal data, including protection against unauthorized or unlawful processing and against accidental loss, destruction or damage, using appropriate technical or organizational measures." A number of mobile risks can directly violate this principle: malicious applications that leak or infiltrate information, damage devices by embedding so deeply in the device software that they cannot be removed from the device even with a factory reset, and provide unauthorized remote access; device threats that heighten attacker permissions to spy on communications occurring on the device or cause catastrophic data loss; mobile applications that access contact records and send data to servers residing outside the EU; and mobile devices that are connected to a network that has been compromised by a man-in-the-middle attack, resulting in data being siphoned off the device.

Unintentional data leakage is likely to play a key role. For example, employees may pull information about sales leads onto their mobile devices or a cloud storage instance. Under GDPR, for example, individuals in the European Union (EU) have the "right to be forgotten." If a sales lead requests that the company delete their information, the company would not know about, nor have access to, the data in those personal apps and cloud storage instances, and thus potentially incur a GDPR infringement. In another example, an enterprise chief financial officer may frequently access customer billing information and contract details on an officer's mobile device using a "mash-up" application that combines a customer relationship management (CRM) application programming interface (API) together with APIs from the officer's subscription billing service. The officer's custom application does not have the same security protections as the official CRM application for storing and transmitting GDPR regulated personal data from the CFO's mobile device. Companies need to know what data is being accessed on mobile devices, who is accessing the data, how this data access is being controlled, and where the data goes. Without this visibility, the company risks compliance under GDPR.

Embodiments of the present invention provide solutions for improving the validation of applications for installation on a mobile device under a governance model. More specifically, embodiments of the present invention improve security of sensitive information by checking, in advance of an installation of an application, authorizations that an application requires and creates an application approval list for any sensitive data stores. "Sensitive information" or "sensitive data" as used herein, refers to data pertaining to the user that is created, entered, and/or stored while using an application or device, and for which the user has at least some expectation of privacy. Sensitive information can include information pertaining to a user's racial or ethnic origin, political opinions, religious beliefs, membership to an organization, physical, mental or health condition, sexual life, commission or alleged commission of any offense. Sensitive data includes, but is not limited to, contact information, pictures, audio, or any other configurable data types that a person can store data in that an application can access.

Embodiments of the present invention can further improve security measures with respect to sensitive information by determining a list of individuals associated with the sensitive data and requesting permission from the list of individuals to allow an application access to sensitive data. If approval is given, then the application is permitted for installation on the mobile device. If approval is not given, then either the application is removed, or the sensitive data is removed from the mobile device. As used herein, an "election" is a selection made by an individual that either approves or denies an application access to sensitive data associated with the individual.

Some embodiments of the present invention are capable of recording elections made by a set of individuals through distributed ledger (e.g., blockchain) technology. By using blockchain technology, the history of elections made by a set of individuals are immutably stored, thereby allowing guaranteed traceability of elections. Blockchain refers to a distributed, permissioned, and immutable ledger capable of recording transactions. Blockchain is a decentralized technology consisting of a peer-to-peer (P2P) network including computers referred to as nodes. Blockchain further includes methods for the nodes to validate transactions. Once a transaction is validated by the nodes, a new block is added to the existing blockchain containing information to confirm the transaction.

Figure 1:
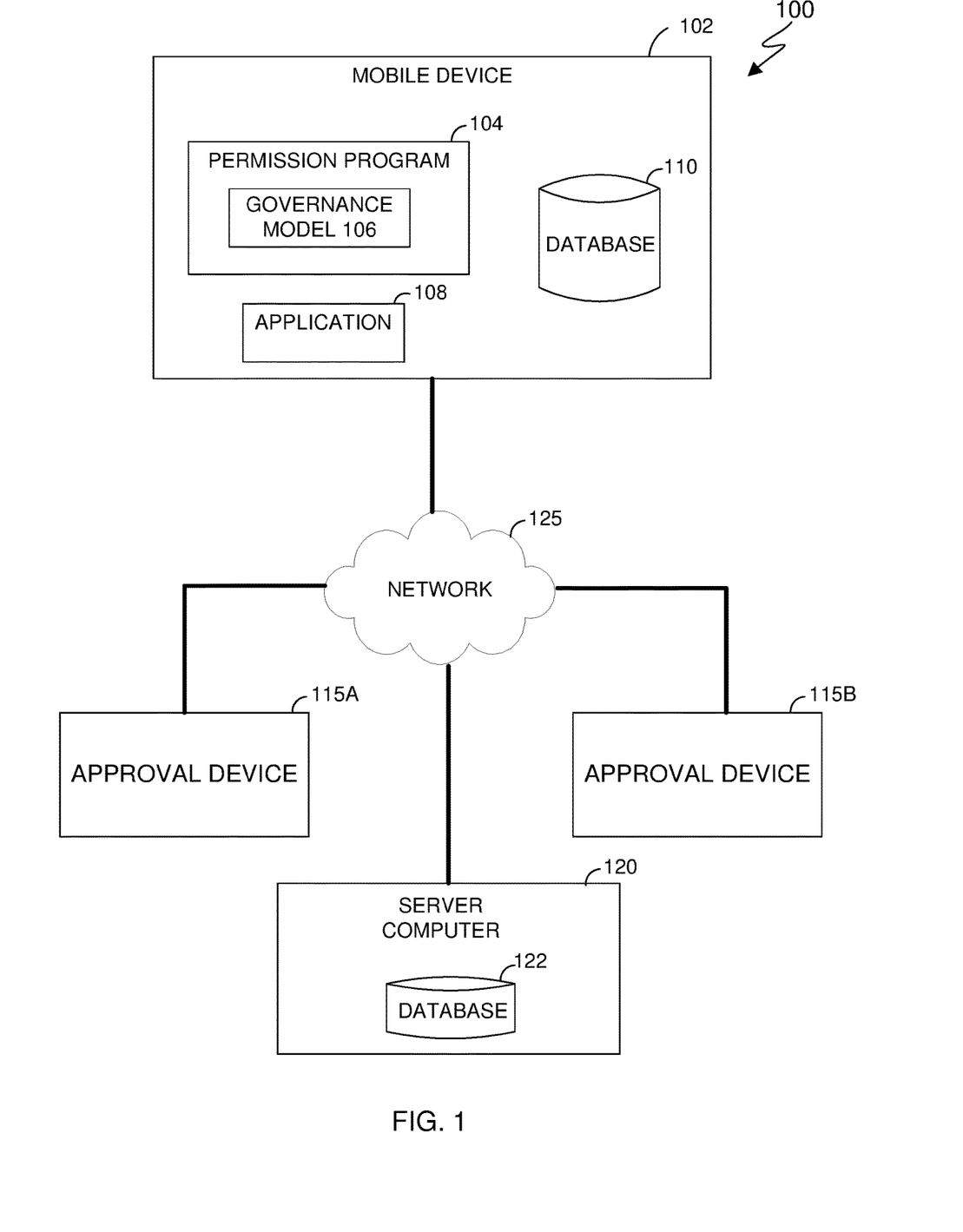
FIG. 1 is a functional block diagram illustrating an application permission environment, in accordance with an embodiment of the present invention.

FIG. 1 is a functional block diagram illustrating an application permission environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Application permission environment 100 includes mobile device 102, approval device 115A, approval device 115B, and server computer 120, all interconnected over network 125. Mobile device 102, approval device 115A, approval device 115B, and server computer 120 can be a standalone computer device, a management server, a webserver, a mobile computing device, or any other electronic device or computing system capable of receiving, sending, and processing data. In other embodiments, mobile device 102, approval device 115A, approval device 115B, and server computer 120 can represent a server computing system utilizing multiple computer as a server system, such as in a cloud computing environment. In another embodiment, mobile device 102, approval device 115A, approval device 115B, and server computer 120 can be a laptop computer, a tablet computer, a netbook computer, a personal computer (PC), a desktop computer, a personal digital assistance (PDA), a smart phone, or any programmable electronic device capable of communicating with various components and other computing devices (not shown) within application permission environment 100. In another embodiment, mobile device 102, approval device 115A, approval device 115B, and server computer 120 each represent a computing system utilizing clustered computers and components (e.g., database server computers, application server computers, etc.) that act as a single pool of seamless resources when accessed within application permission environment 100. In some embodiments, mobile device 102 and server computer 120 are a single device. Mobile device 102, approval device 115A, approval device 115B, and server computer 120 may include internal and external hardware components capable of executing machine-readable program instructions, as depicted and described in further detail with respect to FIG. 5.

Mobile device 102 is a digital device associated with a user and includes permission program 104, application 108, and database 110. In general, permission program 104 determines whether an application (either currently installed, queued for installation, or is selected for possible installation) requires access to sensitive information and determines whether the application has permission to utilize the sensitive data based on an election of an individual. In one embodiment, permission program 104 transmits a request for an election from an individual and stores the election on database 122. Permission program 104 can then process an application queued for installation according to the user election. In this embodiment, permission program 104 can register users via an opt-in or opt-out feature without having to register the user's device via a web portal and browser. Optionally, users can also register his or her device(s) with permission program 104 using the same web portal and browser.

Permission program 104 includes governance model 106. Permission program 104 references governance model 106 to identify sensitive data. In this embodiment, governance model 106 adheres to the General Data Protection Regulation (GDPR) policies. In other embodiments, a user can set other data privacy policies and otherwise modify the set data privacy policies via a user interface component of permission program 104 (not shown).

In one embodiment, governance model 106 includes a list of data types instructed by a governing entity that is categorized as sensitive data. For example, a user, such as a corporate entity, lays out data privacy policies that dictate what data types require permission of an individual to use data types associated with the individual. Data types, as used herein, references data identifiers and can include values, file extensions, programming languages used, or operations that can be performed on the data.

In this embodiment, governance model 106 further includes a GDPR identifier that can be installed on a user device to identify whether a user device is the user's personal device, or a device issued to a user but is property of another entity (e.g., a corporate entity). Permission program 104 can then access governance model 106 to identify a user device as a personal device or not personal device and access user preferences in accordance with whether the device is personal or not personal.

Further, governance model 106 can include certain geographic indicators or locations that can be designated as secure or not secure. In this embodiment, a secure location is defined as a location that permits transfer of sensitive data in compliance of GDPR regulations. Governance model 106 can provide an opt-in/opt-out feature to designate a location as secure and store the selection of the user in a secure blockchain. In this embodiment, permission program 104 can use permission program 104 to identify whether the device containing the geographic indicators is within the boundaries of the geographic location or not within the boundaries of the geographic location. In response to identifying, that the device is not within the boundaries of the geographic location, permission program 104 can then scan the device for entries of information and determine whether the information entered is sensitive or not sensitive as discussed in greater detail with respect to FIGS. 2 and 3.

In this embodiment, permission program 104 can, in response to receiving a request to add information to a device (e.g., personal or non-personal user device), instruct governance model 106 to request that information pertaining to one user be added to a non-personal device of another user. For example, Sue Smith is an employee of Supplier A. Bob Jones has a non-personal device (e.g., a company phone) and wants to add Sue Smith's contact information (e.g., Sue Smith's work number). In this scenario, permission program 104 can reference governance model 106 to identify that the contact information for Sue Smith is sensitive information and based on the policy listed in governance model 106, permission program 104 notifies Sue Smith with a message requesting Sue to allow her data to be added to Bob's contact list. In this manner, permission program 104 and governance model 106 can prevent the addition of sensitive information of a user to another user's device.

In other embodiments, governance model 106 can be used by permission program 104 to scan existing mobile devices (not owned by the user) for sensitive information pertaining to the user. In response to finding sensitive information pertaining to the user on other mobile devices, permission program 104 can instruct governance model 106 to transmit a request from the user to allow the user's information to persist on the other mobile devices. In instances where the user does not give permission, permission program 104 can instruction governance model 106 to delete the user's sensitive information from the other mobile devices.

In another embodiment, governance model 106 can store classifiers for individuals based on a position of the user or based on the user's access to confidential information. For example, governance model 106 can store user A's position at a company along with the user's security credentials. Permission program 104 can then reference governance model 106 and, in response to a request to send user A's personal information to a different device (e.g., for addition to a different contact list) that has not been approved, transmit a request for user A to allow user A's information to be added. In this manner, permission program 104 can prevent transmission of user A's information from one authorized entity to another entity that has not been authorized.

Governance model 106 identifies one data type that match data types listed in the specified data privacy policy. Governance model 106 can list data types that include, but is not limited to, files associated with contact information of an individual, audio files associated with an individual, picture or image files of an individual, and video recording files of an individual. Permission program 104 transmits instructions to governance model 106 to identify and locate sensitive data. In embodiments where application 108 is queued for installation on mobile device 102, permission program 104 can transmit instructions to an application manager (not shown) to either install, stop installation, or otherwise interrupt installation process after determining whether the application being installed (e.g., application 108) has permissions for application 108 to utilize the sensitive data.

In certain other embodiments, permission program 104 deletes sensitive data associated with an individual in response to determining that the individual has elected to deny the application to utilize the sensitive data. In other embodiments, permission program 104 can halt the installation of the application in response to determining that the individual has elected to deny the application to utilize the sensitive data.

In one embodiment, permission program 104 accesses elections that are associated with a set of individuals and determines whether each individual among the set of individuals approves or denies an application to utilize sensitive data based on the elections corresponding to each individual among the set of individuals. If permission program 104 determines that each individual among a set of individuals has approved that the application can utilize sensitive data corresponding to each individual among the set of individuals, then permission program 104 allows the application to install. In other embodiments, permission program 104 can then transmit instructions to automatically install or otherwise force installation of respective devices of the set of individuals.

In instances that permission program 104 determines (using governance model 106) that a subset of individuals belonging to the same group does not approve that the application requests access to and subsequently utilizes respective user's sensitive data corresponding to each individual of the first subset of individuals, then permission program 104 halts the installation of the application or deletes the sensitive data associated to each individual of the subset that does not approve. Conversely, permission program 104 can allow the application to install for the subset of individuals that does approve the application's request to access and subsequently utilize respective user sensitive data.

Permission program 104 can, in some embodiments, control access to some portions of sensitive data while denying access to other portions of sensitive data. For example, permission program 104 can identify certain file image file types (e.g., jpeg, tiff, gif, raw images, etc.) as having permission while other file types such as video files (e.g., avi, fly, wmv, .mov, .mpeg, .mp4, etc.) as not having permission. In certain other embodiments, permission program 104 can identify distinctions within certain file types as having permission. For example, permission program 104 can recognize that image file types created and saved as gif files are personal to the user and thus sensitive data and do not have permissions while jpeg files created when saving project files for work may or may not have permissions. Accordingly, permission program 104 can then determine whether the other file types (e.g., continuation the example above, the jpeg files) have sensitive data according to governance rules and context of content in the jpeg files using a contextual analysis module of an artificial intelligence system.

In certain other embodiments, permission program 104 can permit installation of an application even though certain portions of sensitive data do not have permissions to access the certain portions of data classified as sensitive. In those instances, permission program 104 deletes denied portions of data that is classified as sensitive in order to prevent the application (e.g., application 104) from accessing the sensitive data. In yet other embodiments, permission program 104 may permissively allow installation of the application but block access to the portions of data classified as sensitive.

In one embodiment, permission program 104 stores and reads information on a blockchain. Permission program 104 generates blocks on a blockchain associated with mobile device 102. Permission program 104 records "accept" or "deny" elections for each individual of a set of individuals that have sensitive data stored on database 110 associated with each individual of the set of individuals. When permission program 104 receives an election from an individual among a set of individuals having sensitive data stored on database 110, permission program 104 adds a new block associated with the individual to the blockchain and records the selected election of the individual. Permission program 104 can read the blockchain to check if application 108 has permission to access sensitive data associated with an individual.

In instances when new data is generated, permission program 104 scans the new data and compares elections to a generated blockchain to check if additional approvals are needed from a set of individuals associated with the new data. If approval is needed but not yet existing, data is not stored, or the application is removed.

In this embodiment, application 108 is currently installed on mobile device 102. Mobile device 102 can install other applications (not shown) and receive updates to currently installed applications (e.g., application 108). In other embodiments, application 108 is an application that is queued for installation. In yet, other embodiments (not shown), mobile device 102 can be a "clean device," that is, a device that does not have one or more applications installed by a user.

In general, application 108 is an application that is queued for installation on mobile device 102, wherein application 108 requests access to sensitive data located on database 110. In other embodiments, application 108 is an application that is installed on mobile device 102, wherein application 108 is permitted to access sensitive data located on database 110 as permitted by permission program 104.

Database 110 is a repository for data accessible by permission program 104 and (if permitted by permission program 104) by application 108. Database 110 can be accessed by permission program 104 to determine whether data stored on database 110 is sensitive or not sensitive based on governance model 106. In other embodiments permission program 104 can determine data is sensitive using a governance model along with a contextual analysis module to determine context of the data to classify data as either sensitive or not sensitive information.

In general, database 110 contains data that application 108 is requesting for access. Database 110 can be implemented with a tape library, optical library, one or more independent hard disk drives, or multiple hard disk drives in a redundant array of independent disks (RAID). Similarly, database 110 can be implemented with any suitable storage architecture known in the art, such as a relational database, an object-oriented database, and/or one or more tables.

Approval device 115A and approval device 115B are digital devices that are each associated with an individual (e.g., approval device 115A is associated with person A and approval device 115B is associated with person B). Furthermore, there can be any number of approval devices for any number of associated individuals. For example, approval device 115X (not shown) is associated with individual X. Approval device 115A and approval device 115B receive messages from permission program 104 to request permission from the respective individual to allow application 108 access to sensitive data associated with the respective individual.

Server computer 120 hosts database 122, wherein database 122 stores data describing a set of elections corresponding to a set of sensitive data associated with a set of individuals. For example, database 122 stores data describing an approval election for mobile device 102 to utilize contact information associated with person A. In another example, database 122 stores data describing an approval election allowing a social media application (i.e., application 108) to utilize contact information associated with individual B. In some embodiments, mobile device 102 and server computer 120 are a single device. In some embodiments, the data stored on database 122 that describes a set of elections corresponding to a set of individuals is stored using secure ledger technology (e.g., blockchain). By using blockchain technology, the history of elections made by a set of individuals are immutably stored, thereby allowing guaranteed traceability of elections. In an alternate embodiment, the data stored on database 122 that describes a set of elections corresponding to a set of individuals, wherein the set of elections are signed with a corresponding encrypted signature associated to each individual among the set of individuals, thus certifying that only an individual among the set of individuals can make an election regarding the use of sensitive data associated with the individual among the set of individuals. For example, person A makes an approval election to allow application 108 utilize contact information associated with person A. Database 122 stores the approval election of person A associated with the contact information and furthermore stores an encrypted signature that ensures only person A made the approval election.

Network 125 can be, for example, a telecommunications network, a local area network (LAN), a wide area network (WAN), such as the Internet, or a combination of the three, and can include wired, wireless, or fiber optic connections. Network 125 can include one or more wired and/or wireless networks that are capable of receiving and transmitting data, voice, and/or video signals, including multimedia signals that include voice, data, and video information. In general, network 125 can be any combination of connections and protocols that will support communications among mobile device 102, approval device 115A, and approval device 115B, and other computing devices (not shown) within application permission environment 100.

Figure 2:
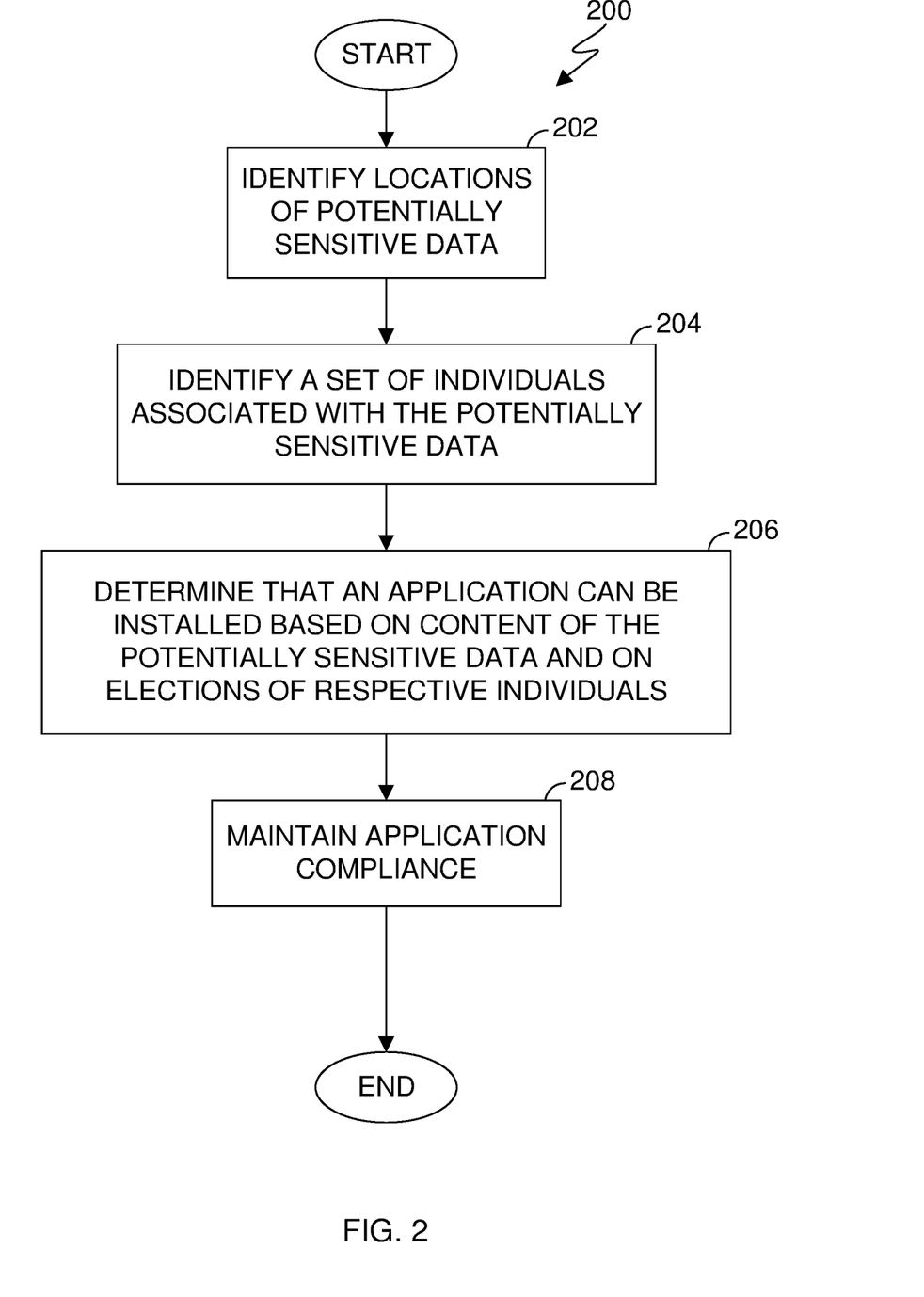
FIG. 2 is a flowchart depicting operational steps for ensuring an application and sensitive data meets data security regulations, in accordance with an embodiment of the present invention.

FIG. 2 is a flowchart 200 depicting operational steps of a permission program for ensuring an application and sensitive data meets data security regulations, in accordance with an embodiment of the present invention.

In step 202, permission program 104 identifies locations of potentially sensitive data. In this embodiment, permission program 104 identifies storage address locations of potentially sensitive data on database 110 by accessing governance model 106 and identifies a set of data types specified by a privacy policy. In this embodiment permission program 104 scans a device of a user for stored data (e.g., database 110). Permission program 104 can then identify storage address locations of data stored on the database that have data types that match data types listed in the privacy policy listed in governance model 106.

In this embodiment, governance model 106 stores a list of one or more sets of data types (e.g., file extensions such as .mp4, .tff, .jpeg, .pdf, etc.) that can potentially contain sensitive information regarding an individual or a set of individuals, which can include, but is not limited to, contact information (e.g., name of the individual, email address, phone number, social media identification, messaging service alias, etc.), images, audio (i.e., audio that captures the voice of the individual(s) speaking), and video recordings. As an example of step 202, among database 110 are a set of files stored in a SQLite3 file format (i.e., ".db") that lists contact information of a set of individuals, a set of audio files with extension ".mp3" and ".mp4", and a set of video files with extension ".avi". Permission program 104 acquires governance model 106, wherein governance model 106 lists files having extensions ".db", ".mp3", ".mp4", and ".avi" as potentially sensitive data types. Permission program 104 identifies the locations of potentially sensitive data based on governance model 106 by scanning database 110 for files having extensions ".db", ".mp3", ".mp4", or ".avi", matching a set of files having the aforementioned extensions, and identifying a set of storage location addresses corresponding to the matched set of files.

In step 204, permission program 104 identifies a set of individuals associated with the located potentially sensitive data. In this embodiment, permission program 104 identifies a set of individuals associated with potentially sensitive data by scanning content of the potentially sensitive data to acquire an identification of an individual. For example, permission program 104 identifies data files associated with a digital address book. In this example, according to the governance model (e.g., governance model 106), file types associated with the digital address book are classified as sensitive. Permission program 104 can then scan the data files associated with the digital address book and use natural language processing techniques to identify person A and person B as well as phone numbers, physical addresses, and email addresses respective to person A and person B from the digital address book.

In another embodiment, permission program 104 can receive a data set containing image files. Permission program 104 can identify a set of individuals by performing facial recognition analysis on a set of images that contain a set of individuals and matching the set of individuals to corresponding images of the set of individuals paired with a digital address book. For example, a data file associated with person A, generally utilized by a digital address book, contains phone numbers, physical addresses, and email addresses respective to person A. Additionally, an image of person A is linked to the data file associated with person A. Permission program 104 identifies that the image of person A is linked to a data file identifying person A (and likewise respective phone numbers, physical address, and emails address of person A) by comparing multiple images and parsing through a number of data files to find one or more links to a data file that confirms person A is linked to personal information such as phone numbers, physical addresses, and email addresses.

In another embodiment, permission program 104 scans the sensitive data using cognitive analysis to identify a set of individuals associated with the sensitive data. Cognitive analysis is a computing process capable of synthesizing data from various information sources while weighing context and conflicting evidence to suggest, with a certain degree of confidence, that the generated solution is within a threshold percentage of accuracy.

In another embodiment, permission program 104 can identify a set of individuals associated with the sensitive data based on metadata associated with the sensitive data that describes the set of individuals associated with the sensitive data. Audio files, images, and videos stored on database 110 can each have respective metadata, such as a "tag", that links a set of individuals to the respective data. For example, picture 1 is an image file that contains an image of person A, recording 2 is an audio file that contains voice recordings of person A and person B, and video 3 is a video file that contains video recordings of person B. Additionally, metadata corresponding with picture 1, recording 2, and video 3 link person A to picture 1, person A and person B to recording 2, and person B to video 3 respectively. Permission program 104 can acquire the metadata corresponding with picture 1, recording 2, and video 3 and identify person A is associated with picture 1 and recording 2, and person B is associated with recording 2 and video 3. In a further embodiment, metadata linked with a sensitive data can include, but is not limited to, a name of the individual "tagged" in the sensitive data and a form of contact information associated with the individual.

In instances that permission program 104 is unable to identify a set of individuals associated with sensitive data, then permission program 104 requests manual identification from a user associated with mobile device 102 to identify the set of individuals associated with the sensitive data. For example, a user takes a photograph of person A using mobile device 102 and the photograph is subsequently stored on database 110. Permission program 104 determines the photograph is sensitive data based on the file extension and a determination that an individual is depicted in the photograph (e.g., using image and object recognition to identify whether a person is depicted in the photograph). Permission program 104 then attempts to identify the individual depicted in the photograph using facial recognition methods to match the individual depicted in the photograph to a set of images that have corresponding metadata linked to a set of individuals. In response to not finding an image among the set of images having corresponding metadata that matches the photograph of the individual, permission program 104 displays a message on a display interface of mobile device 102 requesting the user of mobile device 102 to identify the individual depicted in the photograph by requesting a name of the individual and a form of contact information associated with the individual (i.e., phone number, email address, social media account).

Continuing the example above, in response to identifying an image file and receiving a name and a form of contact information associated with the individual, permission program 104 stores metadata associated with the image file depicting the individual onto database 110. Subsequently, permission program 104 can use the image file and associated metadata to link other images of the individual stored on database 110. For example, after storing a first image file containing an individual and storing associated metadata describing the name of the individual and contact information of the individual, a user takes a second photograph using mobile device 102 of the individual such that a corresponding second image file is subsequently stored on database 110. Permission program 104 can use facial recognition methods to match the individual depicted in the second image file with the individual depicted in the first image file and thereby form a link that identifies the individual of the second image file based on the stored metadata associated with first image file. Accordingly, because governance model 106 specifies that images are sensitive data, and because permission program 104 has identified an individual is depicted in the second image file, permission program 104 can identify the second image file as sensitive data as well as identify the individual whose likeness has been captured in the second image file.

In an even further embodiment, permission program 104 can identify a set of individuals associated with the sensitive data based on linked metadata across various forms of sensitive data. For example, a user can record a discussion between the user and another individual using mobile device 102 which would then subsequently be stored on database 110. Permission program 104 can then analyze the recording to identify two individuals are present in the recording. Permission program 104 can then classify the recording as potentially sensitive because of the positive identification of individuals present in the recording.

In other embodiments, permissions program can first identify the individuals in the recording and then based on the identified individuals classify the recording (i.e., data file) as sensitive data or not sensitive data. In instances where permission program 104 analyzes the recording and is unable to identify the recorded voice of the individual, permission program 104 requests the user to manually identify the recorded voice of the individual via user interface of mobile device 102. Permission program 104 can receive at least the name of the individual or contact information from the user and then use the received name of the individual or contact information to match the metadata stored with a photograph of the individual with the recording of the individual, thereby forming a link associating the recording and the first photograph of the individual with the name and contact information of the individual. In instances where more than one image file (e.g., photograph) of the individual are linked, permission program 104 can further form a link between the recording and subsequent image files depicting the individual, thereby forming a network of sensitive data and associated data of the recording, and one or more phonographs that correlates to an individual.

In step 206, permission program 104 determines that applications can be installed based on elections of respective individuals associated with the potentially sensitive data. As used herein, an "election" is a selection made by an individual that either approves or denies an application access to sensitive data associated with the individual. In this embodiment, permission program 104 determines that applications can be installed by collecting elections from each individual of the set of individuals that are associated with the potentially sensitive data and determining whether potentially sensitive data is sensitive data or not sensitive data. Permission program 104 can access elections that are already stored on database 110 or, when an election is unknown, permission program 104 can request elections from a user of mobile device 102 by transmitting a message that includes a request to the user as discussed in greater detail below. In this embodiment, permission program 104 collects elections from the identified set of individuals by acquiring contact information of the individual via previously collected elections of the user stored on a database or identifying contact information of the identified individual by locating stored metadata that describes the contact information of the identified individual. Permission program 104 identifies data as sensitive or not sensitive data by identifying data types, contents of stored data, and comparing contents of stored data with elections made users, as discussed in greater detail with respect to FIG. 4.

In embodiments where an election is unknown, permission program 104 can transmit a message to the user that includes request for an election. In these embodiments, a message can be displayed on a graphic user interface of mobile device 102. Permission program 104 can also transmit a message using an electronic mail service to an email address of the user. For example, permission program 104 emails the individual using the email address associated with the individual requesting: "John Doe would like to store a photo on [mobile device 102] that has been identified to contain you in the photo. Do you grant John Doe permission to store this photo? Send a reply message with 'Y' to accept, or 'N' to reject."

In yet other embodiments, permission program 104 can request an election from the individual by sending a text message to the individual based on the contact information of the individual. For example, contact information associated with the individual lists a phone number associated with the individual. Permission program 104 sends a text message to the phone number associated with the individual requesting: "John Doe would like to store a photo on [mobile device 102] that has been identified to contain you in the photo. Do you grant John Doe permission to store this photo? Send a reply message with 'Y' to accept, or 'N' to reject."

In another embodiment, permission program 104 can request an election from the individual by calling a number associated with the individual based on the contact information of the individual and playing a prerecorded message requesting a selection. For example, permission program 104 calls the individual using the phone number associated with the individual, and in response to the individual answering the phone, permission program 104 plays a prerecorded message saying: "John Doe would like to store a photo on [mobile device 102] that has been identified to contain you in the photo. Do you grant John Doe permission to store this photo? Press '1' to accept, or '2' to reject."

In instances that permission program has received an election not already stored on a database, permission program 104 can, in response to receiving an election from an individual, permission program 104 store the election in a secure database. In one embodiment, a secure database can be a blockchain associated with mobile device 102 stored on database 122. In this embodiment, permission program 104 receives an election from the individual along with an encrypted signature that certifies that the election corresponds to the individual. Permission program 104 generates a new block on a blockchain that stores: a timestamp of the received election, the election of the individual (i.e., approve or deny) corresponding to the sensitive data associated with the individual, metadata linking the election to a data file deemed as sensitive data, and the encrypted signature that certifies that the election corresponds to the individual. In another embodiment, a secure database can be any database that maintain security protocols which prevent manipulation of the election made by the individual (i.e., database 122). In a further embodiment, if permission program 104 receives a rejection election from an individual, then permission program 104 deletes the sensitive data associated with the individual.

In step 208, permission program 104 maintains application compliance. In this embodiment, permission program 104 maintains application compliance by processing application requests according to the user's elections. For example, permission program 104 processes application requests according to the user's elections by determining whether the application can be installed by determining the data types the application is requesting for access, identifying sensitive.

In instances where there is a blanket election that states that the requesting application is not allowed access to any data, permission program 104 delays application installation. Permission program 104 delays application installation by halting installation processes. In some embodiments permission program 104 can transmit a message to the user requesting permission be granted to allow for installation of the application.

In instances where an election specifies that some types of data listed in governance model 106 is allowed access to but specifies that other types of data are not allowed access to, permission program 104 installs the application and prevents the installed application from accessing the specified data types that have not been authorized by the user.

In instances where an application is already installed and new data is generated, permission program 104 parses the generated data and processes the data according to the elections made. For example, where permission program 104 identifies that a data file contains information that is sensitive and the application does not have permission to access that information, permission program 104 bars access to that information. In this embodiment, permission program 104 bars access to that information by deleting data files containing sensitive information. In other embodiments permission program 104 can block access to the sensitive information by moving the file and its contents behind a firewall inaccessible to the application.

In instances where permission program 104 has been installed on a mobile device having one or more applications previously installed, permission program 104 can perform the operational steps of flowchart 200 and maintain application compliance. For example, permission program 104 determines whether both existing and new data must be deleted to maintain application compliance.

In instances where existing data is analyzed by permission program 104, permission program 104 can identify file types that are designated as potentially sensitive from a comparison on the list of data types listed in governance model 106. Permission program 104 can then classify the identified file types as sensitive or not sensitive. Permission program can then reference (e.g., by retrieving user elections from database 122) or collect elections from the user pertaining to each file that is classified as sensitive and then process according the elections. For example, permission program 104 can remove (e.g., delete, sequester, or otherwise make unavailable) the sensitive data to a requesting application.

Figure 4:
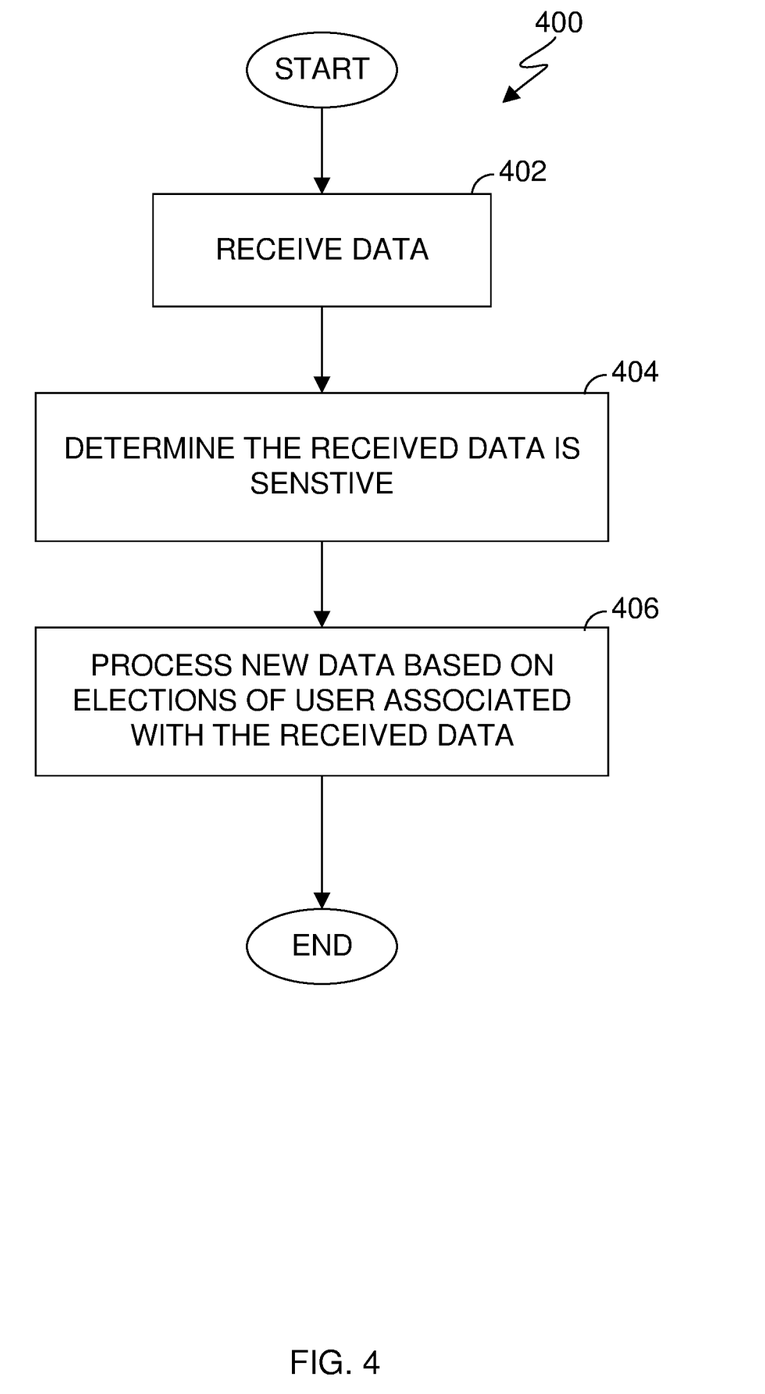
FIG. 4 is a flowchart depicting operational steps of determining whether new data must be deleted to maintain application compliance, in accordance with an embodiment of the present invention.

In this embodiment, responsive to determining new data is generated, permission program 104 determines whether the new data is sensitive data, checks the election of an individual associated with the new data, and processes the new data based on the election of the individual associated with the new data as described in greater detail with regard to FIG. 4, flowchart 400.

Figure 3:
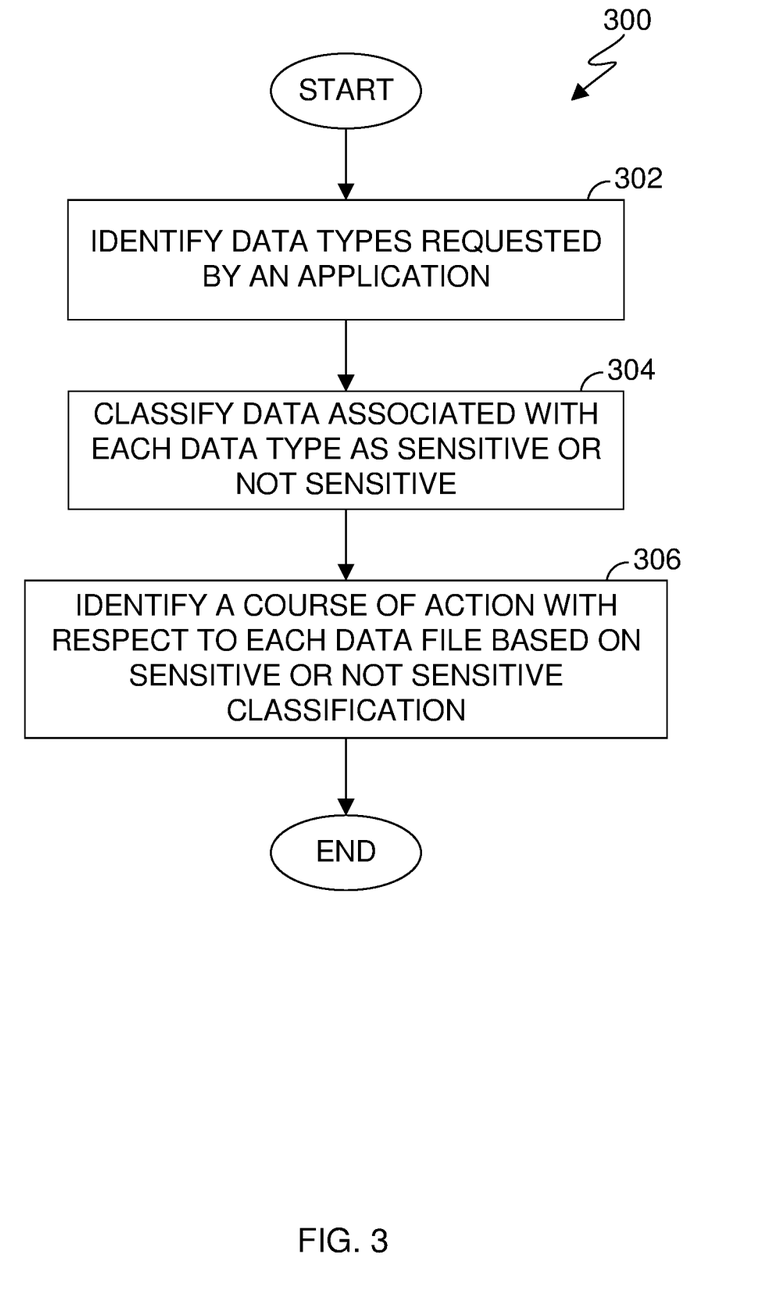
FIG. 3 is a flowchart depicting operational steps for determining whether information contained in data files is sensitive or not sensitive based content of the data files and elections of a user, in accordance with an embodiment of the present invention.

FIG. 3 is a flowchart 300 depicting operational steps for determining whether information contained in data files is sensitive or not sensitive based content of the data files and elections of a user, in accordance with an embodiment of the present invention. In this example flowchart, permission program 104 parses through contents of a mobile device in real time in response to an application's requests for one or more data files however, it should be understood, permission program 104 can parse through contents of a mobile device upon installation of permission program 104, in response to a request from a user to parse through contents of a mobile device, or at a scheduled time frame interval designated by the user.

In step 302, permission program 104 identifies data types requested by an application. In this embodiment, permission program 104 identifies data types requested by an application by parsing contents of a user device. For example, in response to a request to file types by an application, permission program 104 can access database 110 and look for file types that match the request of the application. In other embodiments, permission program 104 can additionally search contents of other devices associated with the user.

In step 304, permission program 104 classifies data associated with each data type as sensitive or not sensitive. In this embodiment, data is classified as "sensitive" when data pertaining to the user that is created, entered, and/or stored while using an application or device. Data is considered to be "sensitive" can include information pertaining to a user's racial or ethnic origin, political opinions, religious beliefs, membership to an organization, physical, mental or health condition, sexual life, commission or alleged commission of any offense. Sensitive data include, but is not limited to, contact information, pictures, audio, or any other configurable data types that a person can store data in that an application can access. In this embodiment, permission program 104 classified data associated with the identified data type using an artificial intelligence module that is configured to use a combination of natural language processing techniques, machine learning techniques, object and image recognition techniques to determine contents of data files and whether contents of the data files contain sensitive information pertaining to a user.

In step 306, permission program 104 identifies a course of action with respect to each data file based on a respective classification of sensitive or not sensitive. In this embodiment, a course of action can include transmitting a request to allow data to be shared, transmitting a request to allow data to persist on a device, allowing data to be shared, allowing data to persist on a device and denying access to data that does not have user permission. In this embodiment, "denying access to" as used herein, refers to any action that does not an application access to, modify, or use the data. For example, permission program 104 can deny access by removing (e.g., delete) the data file from the device, securing (e.g., preventing access to) the data file by transmitting an instruction to database 110 to prevent the requesting device (i.e., the device that does not have permission) from accessing to the data file.

Accordingly, permission program 104 can identify a course of action and then maintain application compliance based on the data file type and a classification of content of the data file. In this way, permission program 104 can prevent unwanted access to sensitive information and can retroactively protect user information.

FIG. 4 is a flowchart 400 depicting operational steps of determining whether new data must be deleted to maintain application compliance, in accordance with an embodiment of the present invention. In this embodiment, "new" data refers to the creation or request to add information that may or may not be considered sensitive. For example, new data can include user created content that can be stored electronically such as taking a picture, entering new contact information, creating an email, taking an audio recording, taking a video recording, sharing data files, copying data files, etc. For example, entry of a new contact information (e.g., user B) into user A's contact list is new data. In that example, permission program 104 scans user A's device and classifies user B's information as sensitive. Before storing user B's information, permission program 104 requests permission from user B.

In step 402, permission program 104 receives data. In this embodiment, permission program 104 receives data from mobile device 102. In this embodiment, the data received by permission program 104 is user created content. The received data can include user created content that can be stored electronically such as taking a picture, entering new contact information, sharing contact information, creating an email, taking an audio recording, taking a video recording, sharing data files, copying data files, etc. In other embodiments, permission program 104 receives data from one or more other components of FIG. 1.

In step 404, permission program 104 determines that the new data is sensitive. In this embodiment, permission program 104 determines that new data is sensitive by identifying data types being created and referencing governance model 106 to determine whether any created data has matching data types listed as being potentially sensitive. Permission program 104 then classifies the created data as being sensitive or not sensitive. In this embodiment, permission program 104 classifies the created data as being sensitive or not sensitive by transmitting the data to an artificial intelligence module along with instructions to analyze the data to determine whether the data contains sensitive information as previously described with respect to FIG. 2 (e.g., step 206).

In step 406, permission program 104 processes the new data based on elections of a user associated with the received data. In this embodiment, permission program 104 processes the new data based on elections of a user associated with the received data. In instances where the new data is classified as sensitive, permission program 104 can take the following actions: transmitting a request to allow data to be shared, transmitting a request to allow data to persist on a device, allowing data to be shared, allowing data to persist on a device and denying access to data that does not have user permission, as previously discussed with regard to FIG. 3.

Figure 5:
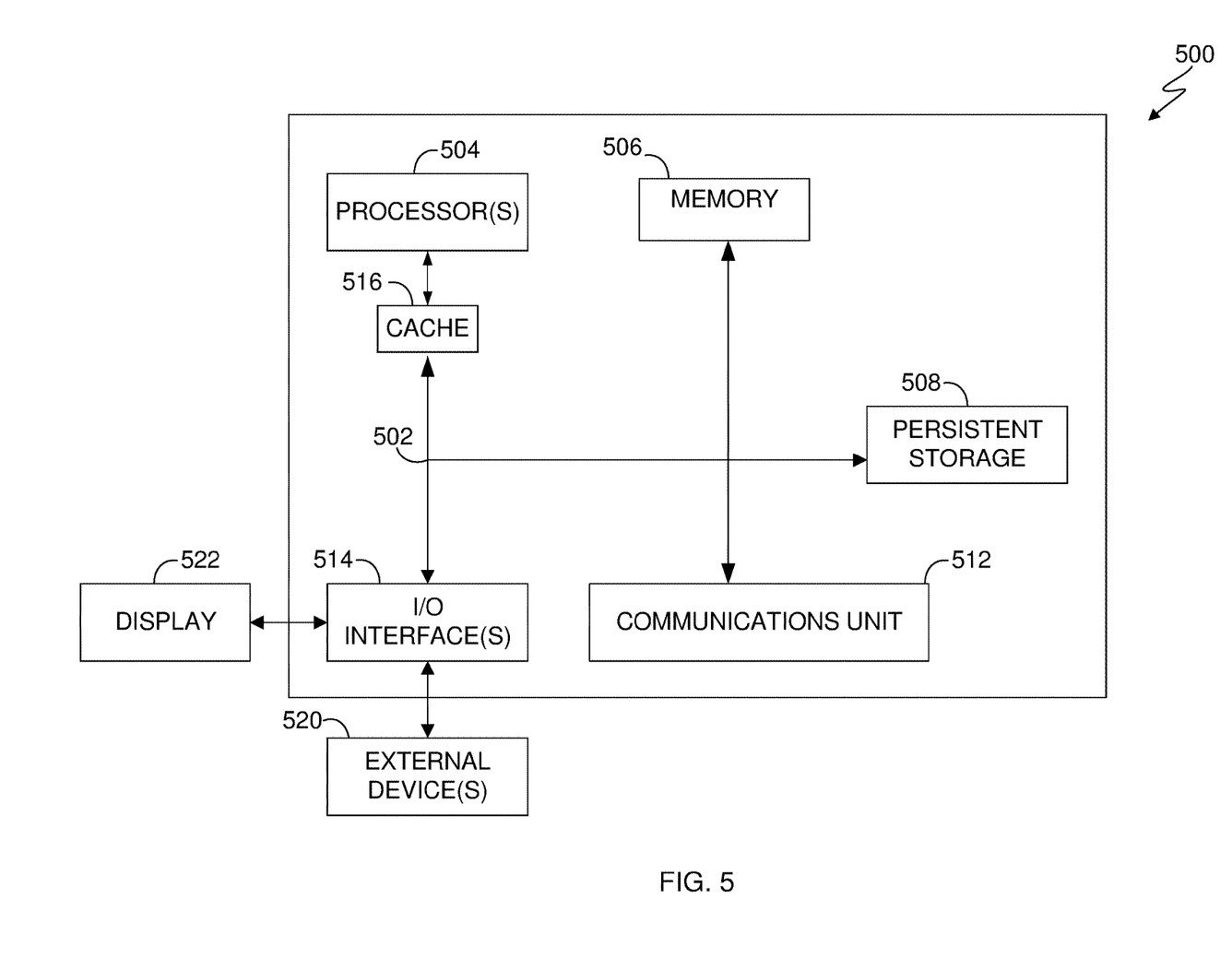
FIG. 5 depicts a block diagram of components of the computing systems of FIG. 1, in accordance with an embodiment of the present invention.

FIG. 5 depicts a block diagram of components of computing systems within haptic display environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Permission program 104 (not shown) may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Permission program 104 may be downloaded to persistent storage 808 through communications unit 510.

I/O interface(s) 512 allows for input and output of data with other devices that may be connected to mobile device 102, approval device 115A, approval device 115B, and/or server computer 120. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., permission program 104, can be stored on such portable computer readable storage media and can be loaded onto persistent storage 508 via I/O interface(s) 512. I/O interface(s) 812 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying locations of potentially sensitive data stored on a user device;

identifying a set of individuals associated with the potentially sensitive data;

installing an application on the user device;

preventing the application from accessing the potentially sensitive data on the user device based on the identified locations of potentially sensitive data, association of the potentially sensitive data with respective individuals, ability of the application to access potentially sensitive data, and a current geographic location of the user device;

in response to identifying that the current geographic location of the user device is outside boundaries of a secure geographic location, scanning the user device for potentially sensitive data;

in response to confirming that the potentially sensitive data is sensitive data and is not within the boundaries of the secure geographic location, removing the potentially sensitive data currently stored on the user device;

scanning a second user device for potentially sensitive data pertaining to a first user;

in response to identifying that sensitive data pertaining to the first user is stored on the second user device, transmitting a request to the first user to allow the first user's sensitive data to persist on the second user device; and in response where the first user does not allow the first user's sensitive data to persist on the second user device, deleting the first user's sensitive data from the second user device.

2. The computer-implemented method of claim 1, further comprising:

receiving data;

determining whether the received data is sensitive; and in response to determining that the received data is sensitive, processing the received data based on elections of a user.

3. The computer-implemented method of claim 1, further comprising:

in response to receiving a request to add information of a second user to the user device of a first user, identifying that the information requested is sensitive data;

generating a notification to the second user associated with the information and transmitting a request to the second user to allow the information to be added to the user device; and preventing addition of the information to the user device based on the second user's response to the request.

4. The-computer-implemented method of claim 1, further comprising:

creating an application approval list for applications accessing the locations of potentially sensitive data specific to a user of the user device; and in response to determining that the application requesting access to potentially sensitive data specific to the user of the user device is not on the application approval list, removing the installed application or removing the sensitive data from the user device.

5. A computer program product comprising:

one or more computer readable storage media and program instructions stored on the one or more computer readable storage media, the program instructions comprising:

program instructions to identify locations of potentially sensitive data stored on a user device;

program instructions to identify a set of individuals associated with the potentially sensitive data;

program instructions to install an application on the user device;

program instructions to prevent the application from accessing the potentially sensitive data on the user device based on the identified locations of potentially sensitive data, association of the potentially sensitive data with respective individuals, ability of the application to access potentially sensitive data, and a current geographic location of the user device;

in response to identifying that the current geographic location of the user device is outside boundaries of a secure geographic location, program instructions to scan the user device for potentially sensitive data;

in response to confirming that the potentially sensitive data is sensitive data and is not within the boundaries of the secure geographic location, program instructions to remove the potentially sensitive data currently stored on the user device;

in response to identifying that the current geographic location of the user device is outside boundaries of a secure geographic location, scanning the user device for potentially sensitive data;

in response to confirming that the potentially sensitive data is sensitive data and is not within the boundaries of the secure geographic location, removing the potentially sensitive data currently stored on the user device;

program instructions to scan a second user device for potentially sensitive data pertaining to a first user;

in response to identifying that sensitive data pertaining to the first user is stored on the second user device, program instructions to transmit a request to the first user to allow the first user's sensitive data to persist on the second user device; and in response where the first user does not allow the first user's sensitive data to persist on the second user device, program instructions to delete the first user's sensitive data from the second user device.

6. The computer program product of claim 5, wherein the program instructions stored on the one or more computer readable storage media further comprise:

program instructions to receive data;

program instructions to determine whether the received data is sensitive; and program instructions to, in response to determining that the received data is sensitive, process the received data based on elections of a user.

7. A computer system comprising:

one or more computer processors;

one or more computer readable storage media; and program instructions stored on the one or more computer readable storage media for execution by at least one of the one or more processors, the program instructions comprising:

program instructions to identify locations of potentially sensitive data stored on a user device;

program instructions to identify a set of individuals associated with the potentially sensitive data;

program instructions to install an application on the user device;

program instructions to prevent an installed application on a user device from accessing potentially sensitive data on the user device based on the identified locations of the potentially sensitive data, association of the potentially sensitive data with respective individuals, ability of the application to access potentially sensitive data, and geographic location of the user device;

in response to identifying that the current geographic location of the user device is outside boundaries of a secure geographic location, scanning the user device for potentially sensitive data;

in response to confirming that the potentially sensitive data is sensitive data and is not within the boundaries of the secure geographic location, removing the potentially sensitive data currently stored on the user device;

scanning a second user device for potentially sensitive data pertaining to a first user;

in response to identifying that sensitive data pertaining to the first user is stored on the second user device, transmitting a request to the first user to allow the first user's sensitive data to persist on the second user device; and in response where the first user does not allow the first user's sensitive data to persist on the second user device, deleting the first user's sensitive data from the second user device.

* * * * *